May 31, 1960  J. PUCCIO  2,938,739
TOWING BUMPER HITCH
Filed May 15, 1958  2 Sheets-Sheet 1
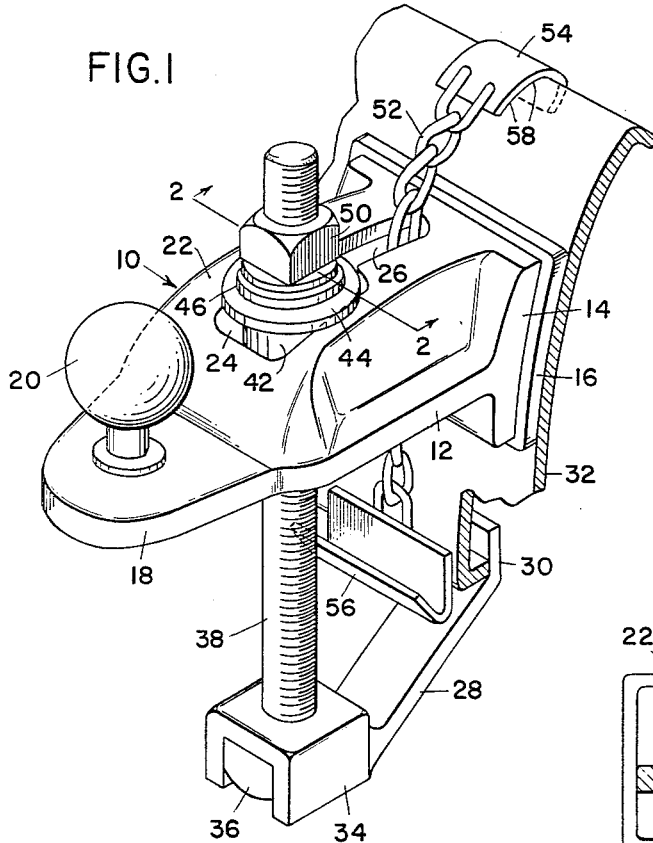
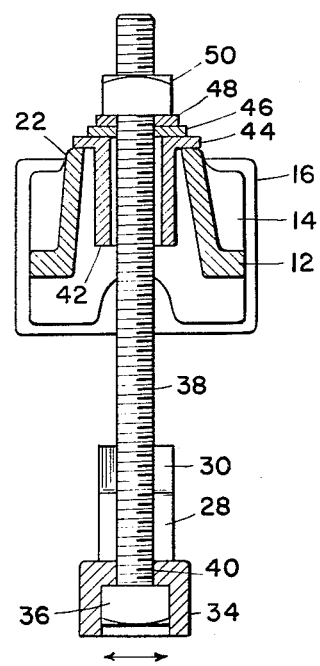
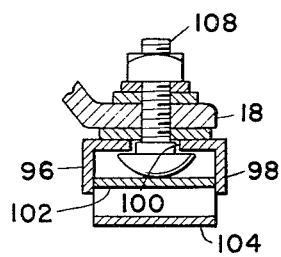
INVENTOR,
JOSEPH PUCCIO
BY Cumpston & Shaw
his attorneys.

May 31, 1960 J. PUCCIO 2,938,739
TOWING BUMPER HITCH
Filed May 15, 1958 2 Sheets-Sheet 2
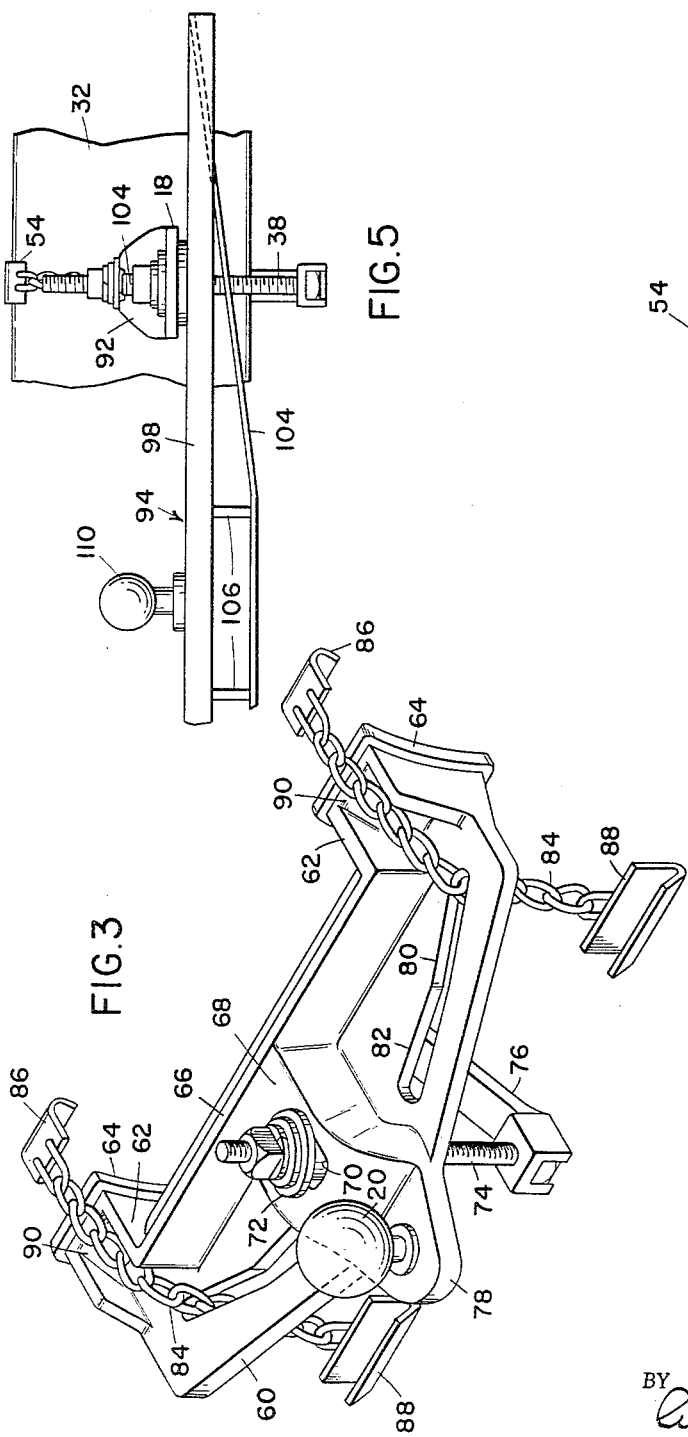
INVENTOR,
JOSEPH PUCCIO
BY Cumpston & Shaw
his attorneys.

United States Patent Office 2,938,739
Patented May 31, 1960

2,938,739

TOWING BUMPER HITCH

Joseph Puccio, 1366 North St., Rochester 21, N.Y.

Filed May 15, 1958, Ser. No. 735,494

4 Claims. (Cl. 280—502)

This invention relates to towing bumper hitches for towing one vehicle by another, one object being to provide an improved hitch of the above character having a more adaptable, rugged and efficient construction.

Another object is the provision of such a hitch having a more adaptable and durable clamping means for attachment to the bumper.

A further object is to supply a hitch having clamping means of the above nature provided with improved towing bars of varying lengths.

Still a further object is the provision of a hitch having the above advantages in a construction capable of being readily and economically manufactured and convenient to apply to a wide variety of conditions.

To these and other ends the invention resides in certain improvements and combinations of parts, all as will be hereinafter more fully described, the novel features being pointed out in the claims at the end of the specification.

In the drawings:

Fig. 1 is a perspective view of a bumper hitch clamping means embodying the present invention;

Fig. 2 is a sectional view on the line 2—2 in Fig. 1;

Fig. 3 is a perspective view of a modified form;

Fig. 4 is a top plan view of a further modification;

Fig. 5 is a fragmentary elevation of the right hand end of the hitch shown in Fig. 4, and Fig. 6 is an enlarged, sectional view on the line 6—6 in Fig. 4.

The embodiment of the invention, herein disclosed by way of illustration, preferably comprises a clamp bracket indicated generally at 10 (Fig. 1) having a substantially horizontal plate portion 12 provided at one end with an upstanding bearing part or flange 14 for engagement with a face of the bumper and provided with a wear-resisting pad 16. Plate portion 12 is provided at its other end with an extension 18 having means for connection with a towing vehicle, such as an opening for the reception of a king pin 20. Plate portion 12 is formed centrally with an elevated platform 22 having therethrough an opening 24 with a constricted portion 26 extending toward flange 14. The side walls of platform 22 are inclined downwardly and outwardly (Figs. 1 and 2) for purposes hereafter described.

Bracket 10 has also a hook portion 28 formed with a hook-shaped end 30 for engagement with the lower edge of a bumper 32. The hook portion 28 has a channel-shaped forward end 34 for engagement with the square head 36 of the threaded bolt 38 which extends upwardly through an opening 40 in the top of the channel-shaped portion 34. Bolt 38 extends upwardly and loosely through opening 24 in platform 22. A cylindrical bushing 42 slidably surrounds the portion of the bolt passing through the platform opening and has at its upper end a flange 44 resting on the platform to support the bushing in the opening. The bolt is provided above flange 44 with a washer 46, a lock washer 48 and a nut 50 supporting the bolt in the bushing and the bushing on the platform. By turning nut 50, hook portion 28 is raised to grip the lower edge of the bumper. It will be seen (Fig. 2) that bolt 38 and its bushing 42 are spaced from the inclined sides of the platform sufficiently to allow the bolt to have some rocking movement on the platform to adjust the hook portion 28 to the bumper. The bushing serves to enclose and protect the threaded portion of the bolt from marring or stripping the threads by contact with the sides of the platform opening during any swinging of the bolt and its hook portion 28 in adjustment to the bumper.

The bracket is clamped in relation to the bumper and its upper edge by means of a link chain 52 having its upper end provided with a hook 54 shaped to engage over the upper edge of the bumper. Chain 52 extends downwardly through slot 26 in platform 22 and carries at its other end a hook 56. The chain is adjusted through opening 24 or slot 26, as by twisting its links, until the upper hook tightly engages the bumper after which the links are locked in engagement with the constricted slot portion 26 of the opening in the platform. Nut 50 is then turned to raise hook 30 and securely grip the bumper between hook 30 and chain hook 54, thereby tightly clamping the bracket to the bumper.

Chain 52 is preferably provided at one end with a hook, as 54, of minimum length, say 1½", and a wider throat 58, of say 1", for engagement with a bumper having a relatively wide and rigid upper edge, while the other hook of the chain is preferably of greater length, say 3", and narrower throat, say ½", for a more extended and rigid engagement with a bumper having a thin edge, thus adapting the hitch for bumpers of different constructions.

A modified form of the invention is shown in Fig. 3, in which the plate portion 60 of the bracket is elongated or spread lengthwise of the bumper and formed at its opposite ends with extensions, as 62, provided with pads 64 for engagement with the face of the bumper. A flange 66 is provided on the plate portion between extensions 62. The plate portion is formed centrally, as in the construction of Fig. 1, with an elevated platform 68 constructed as described, including an opening 70 fitted with a bushing 72 to support and protect a bolt 74 having at its lower end a hook portion 76, all as described above in connection with Fig. 1, the plate portion being extended as at 78 and provided with means such as an opening or king pin for connection with a towing vehicle. It will be seen that the plate portion and its platform 68 and extensions 62 are reinforced and strengthened by flange 66 to provide an exceptionally rugged construction.

The plate portion 60 (Fig. 3) is formed on each side of its platform 68 with an elongated slot 80 extending obliquely to the line of the bearing extensions 62, as shown. Slots 80 have narrow outer ends with a width of, say ⅜", and preferably have their inner ends somewhat enlarged, as at 82, to readily permit the insertion therethrough of a link chain 84 with end hooks 86 and 88 as described above in connection with Fig. 1. The bearing extensions 62 of the plate portion 60 are preferably recessed as at 90 to loosely retain chains 84 and allow some adjustment of the hooks longitudinally of the bumper. This modified construction is applied and operated, as described above in connection with the first form of the invention.

A further modification is shown in Figs. 4 to 6, inclusive, comprising a pair of bracket clamps 92 having the construction shown in Fig. 1, combined with a tow bar 94 of longer construction built up of standard structural steel parts to afford a still wider spread. Tow bar 94 is preferably constructed of two parallel angle irons 96 and 98 in parallel spaced relation with each other to provide a bolt receiving slot 100 therebetween. The angle irons or bars have their depending flanges connected by stiffening plates, as 102, welded thereto below the upper flanges of the angles to leave clearance for the slidable reception of bolts carried by the clamping brackets. The angle irons are further reinforced by a truss bar 104 (Figs. 5 and 6) having its ends welded to the ends of the angle irons but with its central portion spaced downwardly therefrom and connected therewith by stiffening plates 106 to produce a rugged truss construction for the tow bar. The tow bar is connected to the bracket clamp extensions 18 by means of bolts 108 (Fig. 6) adjustably slidable in the slot 100 between the angle irons so that the bracket clamps may be readily adjusted longitudinally of the bumper to accommodate the bumper guards or other bumper parts. Tow bar 94 is equipped at its center with a king pin 110 fixed on a plate 112 welded between the angle irons 96 and 98, and it will be seen that this modification has the advantages of the bracket clamp shown in Fig. 1 with wide adjustability to suit the requirements of various constructions and conditions.

It is apparent from the above construction that the invention provides a towing hitch of rigid construction with ready adaptability to widely varying conditions of use and in a simple type of construction having relatively few parts capable of being readily manufactured and conveniently adjusted in use.

It will thus be seen that the invention accomplishes its objects and while it has been herein disclosed by reference to the details of preferred embodiments, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. A towing bumper hitch comprising a bracket having a substantially horizontal plate portion provided at one end with an upstanding bearing part for engagement with the face of a bumper, said plate portion being provided at its other end with an extension having means for connection with a towed vehicle, an elevated platform on said plate portion formed with an opening therethrough having a narrow, forwardly extending slot portion, a hook portion below said plate portion having a threaded bolt extending loosely upward through the opening of said platform and having a hook-shaped end for engagement with the lower edge of a bumper, a bushing extending loosely through the opening in said platform with a flange at its upper end resting on said platform to maintain said bushing therein, said bolt being enclosed in said bushing and protected thereby against injury of its threads by contact with the sides of said platform with said bushing and bolt substantially closing the rear end of said slot portion, nut means on said bolt and bearing against said bushing to clamp said hook portion against said bumper, and a link chain having one end provided with a hook for engagement over the upper edge of the bumper and its other end passed through said slot portion of said opening in said platform and confined therein by said bushing and bolt for adjustable interlocking engagement of the links of said chain with the sides of said opening.

2. A towing bumper hitch comprising a bracket having a substantially horizontal plate portion provided at one end with an upstanding bearing part for engagement with the face of a bumper, said plate portion being provided at its other end with an extension having means for connection with a towed vehicle, an elevated platform on said plate portion formed with an opening therethrough having a narrow, forwardly extending slot portion, a hook portion below said plate portion having a threaded bolt extending loosely upward through the opening of said platform and having a hook-shaped end for engagement with the lower edge of a bumper, a bushing extending loosely through the opening in said platform with a flange at its upper end resting on said platform to maintain said bushing therein, said bolt being enclosed in said bushing and protected thereby against injury of its threads by contact with the sides of said platform with said bushing and bolt substantially closing the rear end of said slot portion, nut means on said bolt and bearing against said bushing to clamp said hook portion against said bumper, and a link chain passed through said slot portion of said opening in said platform and confined therein by said bushing and bolt for adjustable interlocking engagement of the links thereof with the sides of said opening, said chain having each end thereof provided with a hook for engagement over the upper edge of the bumper, one of said hooks having a greater length and narrower throat than the other hook, for engagement with a bumper of thin construction.

3. A towing bumper hitch comprising a bracket having a substantially horizontal plate portion formed at one end with an upstanding flange provided with a wear-resisting pad for engagement with the face of the bumper, said plate portion being provided at its opposite end with an extension having means for connection with a towed vehicle, an elevated platform on said plate portion formed with an opening therethrough having a narrow, forwardly extending slot portion, a hook portion below said plate portion having a threaded bolt extending loosely upward through the opening of said plate and having an outer end of hook shape for engagement with the lower edge of a bumper, a cylindrical bushing sleeve extending loosely through the opening in said platform with a flange at its upper end resting on said paltform to support said bushing therein, said bolt being slidably enclosed in said sleeve and protected thereby against injury of its threads by contact with the sides of said platform with said bushing and bolt substantially closing the rear end of said slot portion, nut means on said bolt for pressing said sleeve flange against said platform to raise said bolt and clamp said hook portion on said bumper, and a link chain having one end provided with a hook for engagement over the upper edge of the bumper and its other end passed through said slot portion of said platform opening and confined therein by said bushing and said bolt for adjustable interlocking engagement of its links with the sides of said slot portion of said platform opening.

4. A towing bumper hitch comprising spaced brackets each having a substantially horizontal plate portion provided at one end with an upstanding bearing part for engagement with the face of a bumper, each of said plate portions being provided at its other end with an extension formed with a bolt receiving opening, an elevated platform having spaced sides extending upwardly from each of said plate portions and formed with an opening therethrough between said sides having a narrow forwardly extending slot portion, a hook portion below each of said plate portions having a threaded bolt extending loosely upward through the opening of each platform and having a hook-shaped end for engagement with the lower edge of the bumper, a bushing extending loosely through the opening in each platform with a flange at its upper end resting on said platform to maintain said bushing therein, said bolt being enclosed in said bushing and protected thereby against injury of its threads by contact with the sides of said platform with said bushing and bolt substantially closing the rear end of said slot portion, nut means on each bolt and bearing against said bushing to clamp said hook portion against said bumper, link chains each having one end provided with a hook for engagement over the upper edge of the bumper and its other end passed through said slot portion of said opening in each platform and confined therein by said bushing and bolt for adjustable interlocking engagement of the links thereof with the sides of said slot portion, and an elongated tow bar formed by angle irons in parallel spaced relation with each other to provide a bolt receiving slot therebetween, stiffening plates connecting said angle irons below said slot and a truss bar connecting the ends of said tow bar with its central portion spaced below said angle irons and connected therewith by stiffening plates, a bolt in the opening of said plate portion extension and slidably engaged in the slot between said angle irons and a king bolt on said angle irons for connection with a towing vehicle.

References Cited in the file of this patent

UNITED STATES PATENTS

| | | |
|---|---|---|
| 2,542,907 | Dayton et al. | Feb. 20, 1951 |
| 2,772,099 | Smith | Nov. 27, 1956 |
| 2,791,445 | Wanamaker | May 7, 1957 |
| 2,814,506 | Croft | Nov. 26, 1957 |